United States Patent Office 3,403,069
Patented Sept. 24, 1968

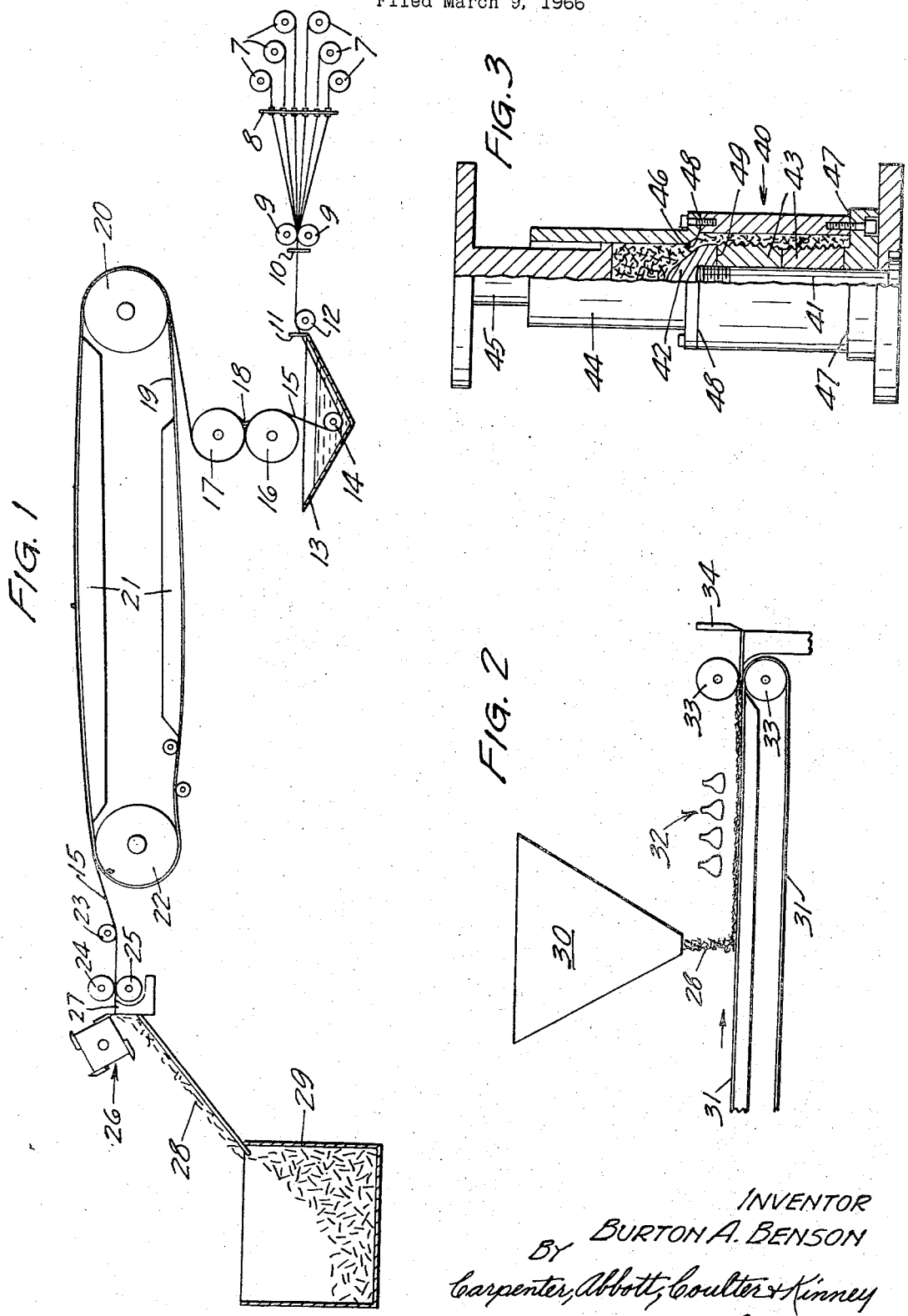

3,403,069
RESIN COATED SINGLE FIBERS FOR MOLDING COMPOSITIONS
Burton A. Benson, Richfield, Minn., assignor to Minnesota Mining and Manufacturing Company, St. Paul, Minn., a corporation of Delaware
Continuation-in-part of application Ser. No. 788,461, Jan. 22, 1959. This application Mar. 9, 1966, Ser. No. 551,816
4 Claims. (Cl. 161—170)

ABSTRACT OF THE DISCLOSURE

Filament-reinforced molding composition comprising a mass of scattered, discrete, flat, resin-coated, mono-yarn and multi-yarn fiber segments. The fiber segments, which are generally between about ⅛ and 2 inches in length, are formed by arranging continuous yarns in a compact single-layer web, coating the web with a thermosetting organic resin composition, bringing the resin to a tack-free, brittle state, and then chopping the web.

---

This application is a continuation-in-part of copending application S.N. 788,461, filed Jan. 22, 1959, and now abandoned, which was itself a continuation-in-part of copending application S.N. 714,856 filed Feb. 12, 1958, and now abandoned.

Resin moldings reinforced with fibrous glass have recently attained considerable commercial stature by virtue of, among other qualities, their light weight, high impact resistance, high strength, and good resistance to weathering and to the action of chemicals. Since the tensile strength of the fibrous glass reinforcement greatly exceeds that of the resin, maximum tensile strength is normally attained with a high percentage of glass. However, sufficient resin must be employed to insure against voids in the molding, since areas with voids are much inferior in strength and durability to areas fully impregnated with resin.

The highest strength reinforced resin products presently being marketed are laminates of essentially continuous bundles of fine glass monofilaments, either woven as a fabric or in non-woven lineal alignment. While these products have exceeding high strength in the plane of lamination, their strength in directions through the laminate is usually less than $1/_{30}$ of that in the plane of lamination. Also, to build a reinforced resin laminate of variable thickness, it is difficult to attain good strength, since it may be necessary to lay up the fibrous reinforcement in a patchwork manner. If portions of the laminate are machined away, some areas my be weakened considerably, if the filaments reinforcing such areas do not extend into the main body of the laminate.

For uses requiring more uniform strength in three dimensions, strands of fibrous glass may be randomly intermingled and impregnated with resin. A number of useful techniques were known prior to this invention, but each yielded products much inferior in strength and uniformity to the above-discussed resin laminates.

The inventor has now devised a reinforced resin molding composition which is characterized by excellent flow ability and by the extraordinary strength and uniformity of the novel molded and cured products obtained therewith. Flexural, tensile and compressive strengths of such molded products compare favorably to strength measurements in the plane of lamination of the strongest resin-impregnated laminates. For example, molded objects made from preferred molding compositions of this invention exhibit flexural and tensile strengths of more than 40,000 and 20,000 pounds/square inch and up to 90,000 and 40,000 pounds/square inch and more, respectively. Moreover, the novel molded products approach isotropy in three dimensions.

By virtue of its excellent flowability, the novel molding composition may be injected under suitable conditions into a matched die set. This capability makes possible, for the first time, large-scale, economical production of high-strength plastic pipe fittings, which heretofore have usually been laboriously built around forms with pieces of resin-impregnated glass fabric and lengths of glass yarn. The novel molding composition is also well suited fo ruse in preforming apparatus. In such use, it provides for the first time, to the inventor's knowledge, preformed products of controlled resin-glass proportion, and by its use, the fabrication of reinforced resin molded products in such apparatus is substantially simplified.

Briefly, the reinforced resin molding composition of this invention comprises a mass of loose fiber segments, each fiber segment in turn comprising at least one resin-coated threadlike "fiber" of reinforcement. Typically, each fiber of reinforcement consists of a group of many bunched, essentially-parallel glass monofilaments such as a strand, yarn, or roving of monofilaments, each of the monofilaments having a diameter between about 0.0002 and 0.0006 inch and having a resin-receptive surface treatment. Each of said fiber segments is coated with strongly-adherent, tack-free resin in an amount of about 35–60 percent of the total volume of the resin-coated fiber segment. Each of the resin-coated segments has a length of about $1/_{32}$ to 3 inches and a circumference on an average not more than 0.05 inch. To achieve the high strength products desired, the resins used in the molding compositions of the invention should have tensile, flexural, and compressive strengths of at least about 5,000 pounds/square inch, and preferably more than 8,000, 15,000, and 20,000 pounds/square inch respectively. The resin on initial heating in bulk to the molding temperature attains a viscosity of about 50,000–5,000,000 centipoises. When the novel molding composition is heated to this temperature and is then injected under pressure into a steel mold, the resin does not appreciably flow ahead but remains with the resin-coated fiber segments so that each moves smoothly, lubricated and cushioned by its highly viscous resin-coating. The resin then hardens to a dense, tough, tack-free and preferably thermoset state.

In a preferred embodiment of the invention, groups or bundles of 204 continuous glass monofilaments, each about 0.00038 inch in diameter, are coated with a latent, thermosetting resin composition and subsequently chopped to provide a mass of loose, individual, resin-coated fiber segments averaging about 0.019 inch in circumference each. By a latent thermosetting resin, is meant a resin which remains fusible and heat-curable after prolonged storage at ambient temperatures but which on heating cures readily to an essentially infusible and insoluble state.

Although the novel molding composition may be produced by applying resin to a single bundle of glass filaments by one of a number of known techniques and then chopping the bundle into short segments after first advancing the resin to a tack-free state, such a process is unduly slow and costly. To apply resin simultaneously to a plurality of parallel, widely-space bundles of filaments is likewise wasteful of time and equipment and is not preferred. Instead, it is preferred to combine into a flat, compact, single-layered web and in lineal alignment a plurality of twisted bundles of continuous glass filaments, each of 0.002–0.0006 inch diameter and having a resin-receptive surface treatment. This web is passed under even tension through a path of liquid resin composition which is preferably maintained within the viscosity range of 200–12,000 centipoises. Upon removal from the bath, the resin is advanced to a normally tack-free state, often by simply cooling the resin to ambient temperature, whereupon the web usually spontaneously separates into individual resin-coated bundles. The web is then chopped to lengths of 1/32 to 3 inches to provide a mass of loose resin-coated fiber segments. The fibrous reinforcement, after this coating and chopping process, remains essentially linear and unexcoriated.

Although it is preferred that each fiber segment be completely separate from other segments in the novel molding composition, a few bundles of filaments invariably cohere, but usually they are so lightly bonded to each other that they tend to separate in normal usage. On rare occasion, when produced by the preferred novel technique just described, a large proportion of the fiber segments appear to cohere to other segments for no accountable reason. Because of the superficiality of bond, these seeming aggregates of fiber segments readily separate upon moderate agitation into individual fiber segments, each including a single bundle of 204 monofilaments. Accordingly, an individual fiber segment, as this term is used in this description, is meant to apply to each strand into which an aggregate of fibers breaks up under agitation, as by turbulent air, of less severity than might fracture the filaments or cause substantial quantities of resin to flake away from the fibrous matter. Any individual aggregate which does not so break up is also considered to be an individual fiber segment, even though it be several times as large as most fiber segments of the molding composition.

It follows from the nature of the coating process that the individual fibers of reinforcement in an aggregate, that is, the individual groups of bunched monofilaments, are substantially parallel to or lineally aligned with, and typically spaced from, one another in shoulder-to-shoulder relation. As noted above, they should be only lightly adhered to one another by the resin coating so that they tend to separate under normal usage, especially in the mold. However, the individual groups of monofilaments should remain substantially integral and form individual, separated, strong fibers of reinforcement. As a result of this separation, the molding compositions of this invention form in the mold a continuous resin binder matrix filled essentially uniformly throughout with randomly intermingled fibrous reinforcement, and then harden, either by curing or cooling, as a monolithic object having high strength properties in all directions. It will be understood that because of the light adhesion between adjacent coated fibers the chopping operation breaks the coated web into fiber segments of no more than a few fibers. It should be noted that whether the fiber segments have undergone sufficient agitation to be broken into smaller segments is not as important as their susceptibility to separation into individual integral fibers of reinforcement in the mold. On the other hand, the better separated the individual fibers of reinforcement are before they are charged to the mold, the better will be the results, and if the adjacent fibers are so strongly bonded together, as discussed hereinafter, that fiber segments of large size resist further separation, strengths will be reduced.

If most of the bundles of filaments are to separate after coating by the above-described novel process into individual resin-coated fiber segments, it is necessary that the filament bundles or "ends" (by which term they are generally known in the industry) be at least lightly twisted. For example, one twist per inch provides good separation whereas only one twist in 18 inches is insufficient. No glass yarn or roving is available commercially at the date of filing this application at a twist intermediate these two degrees of twist, but it is believed that almost one twist per inch is necessary to good separation. More highly twisted yarn is also available and separates readily into fiber segments, each of only about one yarn or bundle of filaments. However, it is preferred for this invention that twisting be held to the minimum at which good fiber separation is realized, since this makes easier the impregnation with resin of the interstices between the monofilaments, whereby stronger molded products may be obtained. If the novel molding composition is produced by other than the above-described novel process, the filament bundles need not be twisted, except as necessary to provide sufficient integrity to allow handling without excessive breakage in the particular resin-coating technique used.

If application of the resin composition to the filament bundles is made by drawing a web of bundles through a liquid resin bath, the viscosity of the bath at the coating temperature should be within the range of 200–12,000 centipoises, as determined with a Brookfield viscometer, and preferably not above 4000 centipoises. At viscosities much greater than 4000 centipoises, it is difficult to hold the resin content in the preferred range of 50% or less by volume unless volatile solvent is present in the resin bath. Also, the resin less effectively penetrates the interstices between the filaments. Below about 200 centipoises, the resin composition tends to run off the filaments.

Resins are preferably coated from solution so that the resin will penetrate the fiber of reinforcement better before soldifying. Further, when resins are coated from solution, a greater latitude is possible in the choice of the resin, especially in the case of resins that have a tendency to cure with heat. Thermosetting resins, after being coated on the strand, are typically advanced in cure, as by passage under heating lamps or over a heated drum, to bring them to the desired state of viscosity under molding conditions.

The viscosity of the bath is readily adjusted by adding solvent or by changing the temperature, with due regard to the importance of avoiding premature curing of the resin in the bath. Normally, the viscosity should remain within the preferred range of 200–4000 centipoises for at least two hours without the addition of fresh resin, if waste is to be avoided. However, by replacing resin taken up by the filament bundles with fresh resin, the pot life is effectively increased, assuming the bath is free from stagnant areas so that the motion of the web of bundles thoroughly stirs the bath.

The proportion of resin is effectively controlled by passing the resin-coated filament bundles through a calender, with allowance for subsequent evaporation of solvents, if such are present. If the proportion of resin is more than 60 percent of the total volume, after evaporation of any volatile solvent, adjacent bundles of filaments tend to cohere if held in shoulder-to-shoulder relationship, resulting in undesirably large fiber segments.

The squeezing action of calender rolls assists in saturating each bundle of filaments by forcing resin into interstices still existing between monofilaments and also assists in providing complete wetting of the glass surfaces by the resin so that adequate anchorage is obtained. Heating of the glass just prior to entering the bath, as by radiant heaters, may also improve bonding between the resin and glass. Filaments which have previously been treated with lubricants or other agents which interfere with resin anchorage may be cleaned by such action, or may first be washed free of such surface treatment in an appropriate solvent bath and the residual solvent removed by heating as just described. Preferably the glass filaments are treated with priming compositions such as silane chemicals or organo-metallic complexes to provide even better bonding of resin to glass.

It has been found that molded products of compositions, the individual fiber segments of which substantially exceed 0.05 inch in average circumference, have much lower strength than compositions comprising resin-coated segments of less than 0.05 inch circumference. The diminution in strength resulting from the use of such larger fiber segments is accompanied by a corresponding loss in uniformity of strength and toughness. For example, if an average of more than about three or four resin-coated bundles, each of which contains 204 of the 0.00038-inch filaments, cohere in shoulder-to-shoulder relationship and resist separation upon chopping and subsequent moderate agitation, the products of such molding compound would be deficient in strength and uniformity.

The above-described novel process has been employed to produce resin-coated fiber segments averaging only 0.006 inch in circumference, and products molded therewith exhibited excellent strength. However, due to difficulty in handling the web of fragile filament bundles in making the molding composition, it is considered to be commercially impractical to attempt to manufacture resin-coated fiber segments averaging less than about 0.01 inch circumference, and it is only because the filaments of the bundles are continuous (in contrast to staple fibers) that such fine resin-coated fiber segments can be produced by the above-described novel process.

Resin-coated fiber segments coming within the approximate limit of $1/32$ and 4 inches in length have been used to provide molding compositions in the practice of this invention. Resin-coated segments of 4-inch length were found to lack flowability whereas fibers of 2–3 inches or less were adequate in this respect for most purposes. Since the strength of products molded from resin-coated fiber segments of 2-inch length are as strong as those obtainable with longer segments, no sound basis for using longer fiber segments exists. Shorter fiber segments are more flowable, but tests with flat molded panels indicate some reduction in strength results. A decrease from one to ½ inch in fiber-segment length is accompanied by a strength reduction of about 10–15 percent, and about the same reduction is experienced in decreasing from ½ to ¼ inch. At fiber-segment lengths below ¼ inch, the decrease in strength is much more significant.

In spite of decreased strength exhibited by flat molded panels, it is often preferred to use very short fiber segments to form highly complex parts, taking advantage of the ability of the short segments to flow through tiny passages and into small crevices. For many such parts, fiber segments of ¼ inch or less outperform longer segments in point of strength of finished product, even though the product molded from the longer segments appears to be more homogeneous. This is believed to be due to more random orientation and better interlocking of the shorter fiber segments in constricted areas. For applications wherein improved results are attained with short fiber segments, even better interlocking is apparently attained if the fiber segments have smaller average circumference.

The novel molding composition exhibits optimum flowability when heated to a temperature at which the resin coating of the fiber segments has a viscosity of about 100,000 to 500,000 centipoises as measured in bulk with a Brookfield viscometer. At temperatures at which the resin viscosity is less than about 50,000 centipoises, the resin tends to flow ahead of the fibers. At viscosities above about 5,000,000 centipoises, it may be necessary to use greater pressure to cause the molding composition to flow than is available with a particular piece of molding equipment. However, it may be preferred in certain situations to utilize molding temperatures at which the resin viscosity is even higher than 5,000,000 centipoises, especially if very high pressure is required to force the molding composition into small pockets, since even less tendency exists at such high resin viscosity for the resin to flow ahead of the fiber segments.

Once the resin-coated fiber segments have completely filled a mold, it may be desired to increase the temperature to speed the cure and to reduce the viscosity of the resin so that a good deal of resin leaves the mold as a flash, whereby a product of increased glass proportion and consequently increased strength is attained. The pressure may be simultaneously increased to implement such resin flow, but care should be exerted in forming thin panels to avoid crushing of the glass. Pressure of 7000 pounds per square inch have been applied during the curing of bulky parts without apparent injury to the glass filaments but pressures of this order are not recommended for molding thin panels. For most parts, molding pressures fall within the range of 300–5000 pounds per square inch depending on the shape and complexity of the part. In general, useful molding temperatures lie within the range of 250–450° F., and resins used in compositions of this invention should flow, but not be too low in viscosity to flow ahead of the reinforcement fibers, at a range of temperatures within this broad range. If the resin is thermoplastic, the die set is normally quenched as soon as a dense product is obtained, and the molded product is ejected when solidified.

To insure that the molded product is void-free the resin must be substantially free from elements which volatize in normal usage. The presence of voids in the product seriously detracts from its strength and deleteriously affects other qualities of the product in specific applications.

If the resin content of the novel composition exceeds about 60 percent of the total volume, products molded therewith often have resin-rich and consequently weak areas, particularly if the viscosity of the resin is allowed to drop below 50,000 centipoises before the mold cavity is filled to the complete elimination of voids. Moreover, strengths fall off greatly at further increase in proportion of resin. The danger of encountering resin-rich areas is particularly great for complex mold cavities, and in such use, reduction in resin content to about 50 percent of the total volume is preferred. Below about 35 percent resin by volume, it is difficult to obtain void-free products.

To allow the fiber segments to be intermingled in random fashion, their resin coating must be tack-free at normal temperatures. However, if it is feasible to maintain the molding composition under refrigeration, it is only necessary that the resin coating be tack-free under the conditions of refrigeration. By refrigerating the molding composition, a thermosetting resin which is not considered to be a latent type may be utilized for applications requiring storage of the molding composition prior to converting it into molded products.

A better understanding of the invention and the uses to which the novel molding composition may be put may be gained by reference to the drawing in which:

FIGURE 1 is a schematic view in elevation of a preferred apparatus for making the novel molding composition;

FIGURE 2 is a schematic view in elevation of apparatus for making conformable, curable reinforced resin sheet material out of the novel molding composition; and FIGURE 3 is an elevation, partly in section, of apparatus for producing reinforced resin pipe couplings from the novel molding composition.

Referring first to FIGURE 1, a supply of fibrous glass is made available by a bank of spools 7. Each of the spools contains five ends or bundles of 204 lightly twisted glass monofilaments, each of which monofilaments is about 0.00038 inch in diameter. The monofilaments are provided with a thin size coating which serves to improve the adherence of resin to the glass.

The five ends on each of the spools 7 are free from intertwining and so may be maintained in non-overlapping shoulder-to-shoulder relationship to provide a wide web, after being drawn through an eyelet board 8, past a pair of spaced idler rolls 9 and through a comb 10. The latter, together with a comb 11, serves to space each end equally from the next at a density of 70 ends per inch. This single-layered web is drawn across an idler roll 12, into a bath of resin 13, and around a cylindrical roll 14, which is adjusted to carry the web of ends close to the bottom of the bath. The positioning of roll 14 insures that the contents of the resin bath 13 remain fresh. Suitable means (not shown) are provided for maintaining the resin bath 13 at a constant level and for heating the resin to maintain it at a suitable viscosity.

The resin-coated web 15 drawn from the bath 13 is passed between two driven steam-heated rolls 16, 17 which serve to smooth the resin coating and to remove excess resin, which forms a bead 18 at the nip of the rolls 16, 17. The rolls 16, 17 are adjustably spaced to provide a desired proportion of resin in the web 15. The web 15 then joins an endless belt 19, which may be faced with silicone rubber or other tough low-adhesion surface such as polytetrafluoroethylene film. The belt 19 is chilled by moving in contact with a refrigerated driver roll 20 and cold pans 21. The idler roll 22, around which the belt 19 is also entrained, need not be refrigerated since the other cooling means are adequate to harden quickly the resin coating to a non-tacky state. Hardening of the resin is accompanied by spontaneous separation of almost every one of the resin-coated ends from adjacent ends.

The web 15, which now comprises a bank of loose resin-coated ends, is finally drawn past an idler roll 23 and is gripped lightly by a pair of driven rolls 24, 25 to carry it into a conventional adjustable chopping device 26. Each of the rolls 23, 24 and 25 is preferably faced with silicone rubber. The bed knife 27 of chopping device 26 is preferably maintained at about 5° C., since the bed knife may collect resin if at a higher temperature. The action of chopping device 26 assists in breaking the ends apart to provide individual resin-coated fiber segments 28. To afford optimum intermingling of the novel molding composition made up of the fiber segments 28, it may be preferred to agitate the segments as they move toward the bin 29 by, for example, providing means (not shown) for making turbulent the air through which they pass.

It is highly surprising that the individual resin-coated ends of the web 15 break apart. Apparently it is necessary that each filament bundle or end be twisted about one or more turns per inch to realize good separation. Also, the fact that the resin is advanced to a tack-free and thus rather brittle state is an important factor in attaining separation. When an identical web, except that the filament bundles have only one twist in 18 inches, is passed through the apparatus of FIGURE 1 and coated with the same resin under the same conditions, the web does not separate completely and the action of the chopping device produces "boards" of a large number of resin-coated ends. These "boards" have little or no tendency to break into narrower segments, even when agitated vigorously. Even at much lower density of filament bundles in the web during coating, good separation does not result using the essentially untwisted (one twist in 18 inches) glass.

In the apparatus of FIGURE 2, resin-coated fiber segments 28, such as were produced as described above in connection with FIGURE 1, are metered out at a steady rate from a bin 30 to fall in a random manner upon a belt 31. If the belt 31 is foraminous, means (not shown) may be provided for blowing air downwardly through the belt to direct the fiber segments 28 to the belt and to assist in compacting the segments. The deposited fiber segments 28 are warmed, as by infrared lamps 32, to an extent sufficient to soften their resin coating, and are then drawn between a pair of rolls 33, preferably silicone rubber-coated, which compress the segments sufficiently to provide a handleable, shape-maintaining preformed sheet. The sheet may be cut to convenient lengths by means of a knife 34.

When heated to a temperature at which the resin coating has a viscosity in bulk in the range of about 50,000–5,000,000 centipoises, this preformed sheet becomes pliable and may be shaped to conform to complex surfaces. It may then be molded under heat and pressure to produce a dense, tough, monolithic molded object of high strength in three dimensions.

Complex preformed shapes, such as for the production of aircraft radomes, may be made from the resin-coated filament bundle segments 28 of FIGURE 1 by means of conventional preforming apparatus and following steps similar to those described in conjunction with FIGURE 2. Preforms thus obtained need not be compressed, as by pressure rolls 33 before being molded under heat and pressure, but need only be cooled to room temperature in order to be shape-maintaining and capable of withstanding ordinary handling without injury.

Referring now to FIGURE 3, there is shown apparatus which demonstrates the extraordinary flowability of the novel molding compositions of this invention. Mounted centrally in a steel mold 40 of circular cross-section by means of a bolt 41 and torpedo 42 is a two-piece threaded die 43. A cylindrical extension 44 of mold 40 is fitted with a ram 45. The resin-coated fiber segments 28 of FIGURE 1 are placed in the hollow of extension 44, and the mold 40 and extension 44 are heated to a temperature such that the viscosity of the resin on fiber segments 28 is brought within the range of 50,000–5,000,000 centipoises. Pressure is then applied to ram 45, forcing the fiber segments 28 to flow through the narrow ring-shaped orifice 46 and into the cavity around the split die 43. If the quantity of fiber segments held by extension 44 is insufficient to fill this cavity completely, it is necessary to remove the ram 45 to add another charge of fiber segments. However, before adding the second charge, the uppermost segments of the previous charge should be loosened with a screw driver or other tool in order to effect intermingling of the filament bundles of successive charges.

After the molding composition completely fills the cavity around the threaded die 43, the temperature may be raised to hasten curing of the resin. This substantially reduces the viscosity of the resin, whereby some resin can flow away from the fiber segments to form a flash at joints 47 and 48.

When the resin is cured, the mold is taken apart and the reinforced resin casting is sawed at the line of demarcation 49 between the threaded die 43 and the torpedo 42, and each half of the threaded die is screwed out of the casting to provide a threaded pipe coupling of exceedingly high strength. Surprisingly, it is found that the coupling is completely homogeneous, except that the crowns of the threads may occasionally be somewhat rich in resin.

Specific forms of this invention are illustrated by the following examples without intent to be limited thereto.

*Example 1*

Spools of continuous glass filaments marketed by Owens-Corning Fiberglas Co. under the designation "ECG 150–1/0 5 end, treatment 038" were used in this example. These glass filaments were initially provided with a starch mineral oil finish and eventually wound on metal spools. The glass while on the spools was heat-cleaned at a temperature sufficient to remove the finish, and while still so wound was dipped in a solution to provide a size coating of gammaaminopropyltriethoxysilane in the amount of a small fraction of one per cent of the weight of the glass. Each end or bundle of filaments included 204 monofilaments of about 0.00038-inch diameter each.

The glass filament bundles were fed from a large bank of spools through an eyelet board and combs in single layer arrangement and at a density of 70 ends per inch, as illustrated in FIGURE 1 of the drawing, and into a bath of an epoxy resin condensation product of epichlorhydrin and bisphenol A, having a softening point of about 45° C. as determined by the Durran's Mercury Method, and in admixture with a hardener consisting essentially of isophthalyl dihydrazide. By immersion in the bath of resin, which was maintained at 95° C. (at which temperature its viscosity was about 4000 centipoises), the glass filament bundles became a continuous resin-coated web which was passed between a pair of heated steel rollers, the surface temperature of which was about 110° C. and the spacing between which was adjusted to provide the web with a resin content of about 35 percent by weight. Since the specific gravity of the glass was 2.55 and that of the resin was 1.18, the resin-filled web had a glass:resin volume ratio of about 46:54. The resin-coated web was cooled by passing it around a drum, the surface temperature of which was held at about −10° C. As the resin hardened to a tack-free state, almost every individual resin-coated end spontaneously separated from adjacent ends. The web was then chopped to provide a mass of resin-coated fiber segments one-half inch in length, which are useful as a reinforced-resin molding composition as described below.

A quantity of this molding composition was placed in a closed press, the opening of which measured about 8 by 10 inches, the platens of which were preheated to about 165° C., and about 250 pounds per square inch of pressure was applied. After 30 minutes at 165° C., the resin was fully cured, and the resultant ⅛-inch thick panel was immediately ejected. Specimens cut from the cured panel were tested in accordance with Federal Specification L–P–406b for flexure strength (by Method 1031.1), for tensile strength (by Method 1011), and for compressive strength (by Method 1021.1). The same procedure was followed using molding compositons identical except for length of the fiber segments. The data obtained comparing molding compositions of several segment lengths is recorded in Table I. Each strength value is recorded in pounds per square inch. Subsequent work with the same and similar compositions indicates that the flexure value for the 1⅛ inch fiber segments is about 10% low.

TABLE I

| Segment length (inches) | Flexure strength (p.s.i.) | Tensile strength (p.s.i.) | Compressive strength (p.s.i.) |
| --- | --- | --- | --- |
| ½ | 64,000 | 40,000 | 38,000 |
| 1⅛ | 67,000 | 37,000 | 36,000 |
| 4 | 71,000 | 34,000 | |

Higher strengths are obtained if a long, narrow test panel is molded to size and tested in the lengthwise direction instead of using specimens cut from an almost square panel as above, apparently due to the fact that the filaments at the edge of the narrow panel are not cut. Resin-coated fiber segments of identical composition were cured in a mold for 30 minutes at 165° C. and at a pressure of 400 pounds per square inch to provide panels measuring 9 inches by 1 inch by ⅛ inch. The results obtained with these panels at various fiber-segment lengths are recorded in Table II, each value being the average of at least five specimens. It will be noted from this table that rather high strengths are achieved with molding compositions of this example that use reinforcement about 3/32 inch in length, and through interpolation it will be seen that molding compositions using reinforcement ⅛ inch in length would give strengths approaching 50,000 pounds/square inch.

TABLE II

| Segment length (inches) | Flexure strength (p.s.i.) | Modulus in flexure (p.s.i.) |
| --- | --- | --- |
| 1/32 | 28,500 | 3,000,000 |
| 3/32 | 43,500 | 2,900,000 |
| ¼ | 71,000 | 3,200,000 |
| 1 | 92,000 | 3,600,000 |

Other of the panels of 1-inch segment length of Table II showed a flexure strength of 190,000 p.s.i. when tested at −60° C. and a wet flexure strength at 24° C. of 78,000 p.s.i., when tested immediately after removal from distilled water in which it was boiled for two hours and then cooled.

To demonstrate the three-dimensional isotropy of the molded products of the composition of this example, ½-inch resin-coated fiber segments were placed in a rectangular mold, 2 by 3 inches at the base and 6 inches in height. The mold had been preheated to 95° C. The molding composition was compressed to three inches in height under a pressure of 1000 pounds per square inch, after which the temperature of the mold was raised to 165° C. and maintained for 45 minutes. Upon cooling, the molded block was sawed into vertical and horizontal specimens of ⅛-inch thickness, the block having been compressed in the vertical direction. The specimens showed a horizontal tensile strength of 26,000 pounds per square inch and a vertical tensile strength of 8,730 pounds per square inch.

The test was repeated using one-inch fiber segments of the same molding composition. Horizontal tensile strength was 26,700 p.s.i. compared to 5,000 p.s.i. vertically. Flexure strength of a horizontal specimen was 47,400 p.s.i. and that of a vertical specimen was 13,600 p.s.i.

Because the fiber segments of the molded blocks were poorly interlocked in the vertical direction, the strengths reported for the vertical direction are lower than can be expected in normal use. When using a mold of limited height requiring compaction of the molding composition before its introduction into the mold, care should be taken to insure random orientation of the fiber segments before such compaction, as by stirring or otherwise agitating the mass of segments—a precaution not taken in molding the blocks on which the vertical and horizontal tests were made.

From the molding composition of this example in two-inch segment length was molded an essentially square panel ⅛ inch in thickness, with curing for 30 minutes at 165° C. under 150 p.s.i. The average flexure strength of ten specimens cut from this panel was 80,800 p.s.i. The coefficient of variance in strength of the ten specimens was 7.7 percent. Essentially identical results are attained with molding compositions prepared with glass filament bundles having one twist per inch and having a film-forming size including an adhesion-improving agent. The presence of the film-former does not interfere with breakup into small fiber segments of about one filament bundle each. However, when a web of essentially untwisted glass roving (one twist in 18 inches) having a film-forming size and containing a chrome complex finish to improve adherence of resin was passed through the resin bath of the example, the resin-coated web did not break up into small bundles upon chopping to 2-inch lengths but formed board-like fiber segments. Most of these fiber segments were 1/32 to ⅛ inch in width, i.e., about 0.07 to 0.03 inch in circumference. The average flexural strength of nine specimens cut from a panel made from this composition was only 41,450 p.s.i. and the coefficient of variance in strength was 15.3 percent.

The molding composition of this example, at ½-inch fiber segment length was used to fabricate a pipe coupling of 2-inch nominal diameter and having standard pipe threads, as illustrated in FIGURE 3 of the drawing. With the mold preheated to 65° C. by means of metal platens maintained at 175° C., a charge of the molding composition was forced at a pressure of about 200–500 pounds per square inch through the ring-shaped orifice, which had a width of about 3/16 inch. Three charges of the molding composition were required to fill the mold cavity completely. The pressure was then increased to 3000 p.s.i. After one hour the temperature of the mold had risen to about 140° C., at which time the mold was placed for an additional 2¾ hours in an air circulating oven at an air temperature of 170° C.

After quenching in water, the mold was taken apart and the molded coupling was sawed to release the torpedo and to allow removal of the split threaded die. The coupling was connected by its threads to apparatus exposing it to high internal hydrostatic pressures and withstood 7500 p.s.i. without injury.

An identical coupling, except that the filament bundle segments were one inch in length instead of one-half inch, burst upon exposure to 5700 p.s.i. internal pressure. The best commercially-obtainable reinforced resin pipe couplings of the same size usually fail at pressures below 3500 p.s.i.

*Example II*

A molding composition was made with the resin and by the procedure of Example I but using fibrous glass marketed by Owens-Corning Fiberglas as "ECG 150 1/0 8 end, treatment 008." Each end or bundle of filaments includes 204 monofilaments of about 0.00038-inch diameter each. The glass filaments were produced in similar manner to the production of the glass filaments used in Example I, i.e., by heat-cleaning to remove the initially-applied starch mineral oil or other film-forming finish in the size coating. The spool of glass filaments was then sized by being dipped in a solution of methacrylato-chromic chloride.

An essentially square panel, 1/8 inch in thickness, made from this molding composition (with 1/2-inch filament bundle segment length) and cut to appropriate sizes for testing, yielded a flexure strength of 54,300 p.s.i. and a tensile strength of 29,100 p.s.i. Conditions of cure were 30 minutes at 165° C. under 150 p.s.i.

*Example III*

A molding composition was made with the fibrous glass of Example II and by the procedure of Example I but using a different resin, i.e., a mixture of another epoxy resin with phthalic anhydride as hardening agent. The epoxy resin, specifically Epon 1310, as described by the manufacturer, the Shell Chemical Corporation, as the condensation product of 1,1,2,2 - tetrakis(4-hydroxyphenyl) ethane and epichlorhydrin having about 3 glycidyl ether groups in the molecule. The substituted ethane is believed to be derived from glyoxal and phenol. Some of the phenyl groups may be substituted at the ortho rather than para position with respect to the ethane.

Using resin-coated bundle segments of 1 1/8 inches length, a 1/8-inch thick panel was molded in a heated platen press at a temperature of 165° C. and pressure of 150 p.s.i. for 30 minutes. Several specimens cut from this essentially square panel showed an average flexure strength of 65,000 p.s.i. and an average tensile strength of 32,000 p.s.i.

The molding composition of this example must be kept under refrigeration to remain useful for making molded products whereas the epoxy resin composition of Example I employing a dihydrazide as the hardening agent remains stable for several months at ordinary room temperature. For uses not entailing storage of the molding composition, it may be preferable to employ thermosetting resin compositions which cure more quickly than do the latent and semi-latent resins of the above examples.

*Example IV*

The molding composition of Example I was compared to identical molding compositions except that the monofilament diameters and number of filaments per bundle were changed. Each filament bundle had a twist of one turn per inch. Panels 9 inches by 1 inch by 1/8 inch were molded for 30 minutes at 165° C. under 300 p.s.i. and tested to provide the data reported in Table III, averaging 8 specimens for each molding composition.

TABLE III

| Filament diameter (inches) | No. filaments per bundle | Fiber segment length (inches) | Flexure strength (p.s.i.) |
|---|---|---|---|
| 0.00023 | 102 | 1/4 | 72,500 |
| 0.00038 | 204 | 1/4 | 61,000 |
| 0.00053 | 204 | 1/4 | 61,000 |
| 0.00023 | 102 | 1/2 | 74,000 |
| 0.00038 | 204 | 1/2 | 75,000 |
| 0.00053 | 204 | 1/2 | 73,000 |

The data of Table III shows little change in strength with change in filament diameter, the differences being within margins of error. Since glass yarn having continuous filaments of greater average diameter than 0.00053 inch is not commercially available, it was not possible to test for maximum filament size, but it is nevertheless believed that filaments much larger than 0.0006 inch in diameter may be too brittle for easy handling in the production of the novel molding composition. A strand of 204 0.00053 inch diameter monofilaments has a diameter of somewhat more than 0.01 inch, and a strand of 204 0.0006 inch diameter monofilaments would be somewhat larger. On the other hand, bundles of glass monofilaments of less than about 0.0002 inch diameter are considered too weak to handle in commercially-useful resin coating operations.

*Example V*

A web of glass-filament bundles as described in Example I was passed under even tension through a bath of thermosetting phenol-formaldehyde resin. The resin had been prepared from 1.5 mols of formaldehyde per mol of phenol, using about 0.5% by weight sodium hydroxide as catalyst. A mixture of these ingredients had been reacted until the resin had a viscosity of about 500–1000 centipoises at 80° C., whereupon the mixture was neutralized with an acid such as citric acid. The resin had then been vacuum dehydrated to remove essentially all water. With the web of glass moving at the rate of 6 inches per second, any point of the layer was immersed in the bath of resin which was heated to 80° C., for approximately 6 seconds. The resin-coated web was then drawn between calender rolls maintained at 80° C. and joined to a continuous silicone-treated heat-resistant paper liner. The liner carried the web around a drum, the surface temperature of which was 175° C., across an 8-foot long plate heated to 165° C., and then across a 3.5-foot long plate, the surface of which was maintained at −18° C. The upper surfaces of the two plates together formed a shallow inverted catenary curve. The resin-coated web was wound together with the liner for storage and later unwound and chopped into one-inch fiber segments.

Panels 9 inches by 1 inch by 1/8 inch formed from this molding composition at 165° C. for 30 minutes under 400 p.s.i. were tested at various temperatures after 30 minutes exposure to the test temperature. Average results of at least 3 specimens for each test temperature are recorded in Table IV.

TABLE IV

| Temperature of test, ° C. | Flexure strength (p.s.i.) |
|---|---|
| 24 | 92,000 |
| 93 | 40,500 |
| 149 | 33,000 |
| 205 | 33,000 |
| 260 | 24,000 |

The good retention of strength at high temperatures by cured products of this molding composition indicate it is especially fitted for uses in which exposure to heat might otherwise cause failure.

The brief heating to which the resin-coated web of this example was subjected effected a partial curing or crosslinking of the resin such that upon subsequent further heating to temperatures preferred for curing the resin, e.g. 165° C., the resin was highly viscous and so remained with and lubricated the fiber segments under molding pressure. This is in contrast to most thermosetting resins which become almost water-thin upon initial heating to temperatures at which curing is rapid, a characteristic which enables them to be used for impregnation of porous materials such as bundles of glass filaments without the use of solvents. The fact that the partially cured resin of the molding composition of this example does not become free flowing upon heating makes less critical the control of molding temperature. Because higher temperatures may be employed for molding, the molds are more quickly available for reuse.

Epoxy resin compositions such as those employed in the preceding examples have likewise been partially cured by controlled heating, as in this example, or by partial chemical reaction, e.g., by exposure to ammonia gas, after being coated on a web of continuous glass filament bundles and before chopping.

For certain uses such as for building preforms, it is preferred that the fiber segments have a resin coating which becomes highly tacky with moderate heating so that each segment retains the attitude in which it strikes the preform screen. To have such property, partial curing is normally omitted, except that the resin may be partially cured after the preform is built and before it is pressed and fully cured.

*Comparative example*

A web of lineally-aligned yarns of continuous glass filaments having a vinyl-silane finish as described in U.S. Patent 2,688,007 was coated with the resin and by the procedure of Example I. Each yarn, which had an approximate diameter of 0.025 inch, consisted of five interwoven pairs of intertwined bundles, with 204 filaments of about 0.00038-inch diameter in each bundle, viz., "ECG 140–2/5 'Garan' finish" yarn of Owens-Corning Fiberglas Co. After application of the resin and upon chopping, the yarns readily separated into individual fiber segments of 0.025-inch diameter, comprising 50% resin by volume.

A panel 9 inches by 1 inch by ⅛ inch molded from one-inch fiber segments at 165° C. for 30 minutes under 500 p.s.i. exhibited a flexure strength of 32,000 p.s.i. An identical panel formed from ½-inch fiber segments had a flexure strength of 33,000 p.s.i. These values are substantially lower than those obtained with finer resin-coated fiber segments and indicate the undesirability of utilizing fiber reinforcement of 0.025 inch diameter or of coated fiber segments much greater in circumference than 0.025 inch. This may be compared with Example IV where it was indicated that reinforcement of 204 0.0006 inch diameter monofilaments give good results.

The novel molding composition also may be formed using as the fibers of reinforcement bundles of continuous filaments of quartz-like glass, quartz and other glass-like continuous filaments. The use of a single filament as a fiber of reinforcement instead of a group of bunched monofilaments is less desired, but single filaments of boron are used with good results, especially in specialized uses justifying boron's expense. Carbon filaments such as those formed from cellulose fibers also provide high-strength reinforcement, though they are presently less strong and more expensive than glass. A quartz-like glass yarn which can be used to produce molding compositions of superior high temperature resistance is produced by H. I. Thompson Fiber Glass Co. under the trade designation "Refrasil." It is a leached-out glass containing more than 98% silica. Since its tensile strength is only about 25% that of conventional glass, it is normally not applied to uses requiring particularly high strength. Continuous quartz filaments, on the other hand, are almost as strong as glass filaments and also lend superior heat resistance to molded products of this invention. Accordingly, the term "glass filament" is used generically to include such glass-like filaments.

It should be noted that mold release agents should be employed with the molding compositions of the above examples and with other molding compositions containing thermosetting resins. Thermoplastic resins can often be used without mold release agents. However, thermosetting resins are normally preferred in the practice of this invention because of their good adhesion to glass, resistance to heat, and other well-known points of superiority as compared to thermoplastic resins. A thermoplastic resin which has been used to make molding compositions of some promise is "high impact styrene," rubber-modified styrene. Since this resin is conveniently coated from solution or dispersion, care must be taken to eliminate volatile vehicle before the composition is molded, or the products will not be free from voids.

Additional components such as inert fillers or colored dyes or pigments may be added in small amounts to provide a desired appearance, or to adjust the viscosity of the resin, or for other purposes, without materially changing the characteristics of the molding composition.

What is claimed is as follows:

1. The method of making a reinforced molding composition which flows at a useful molding temperature and molding pressure to occupy completely a complex cavity as a continuous resin binder matrix filled essentially uniformly throughout with randomly intermingled fibrous reinforcement, and that then hardens as a monolithic object having high strength properties in all directions, said method comprising the steps of
   (1) arranging continuous yarns of glass monofilaments into a flat compact single-layer web in which the yarns are in substantially parallel relation, each yarn having
      (a) a diameter of no more than about 0.01 inch,
      (b) a resin-receptive surface treatment, and
      (c) a twist of about one turn or more per inch;
   (2) drawing the web of yarns under even tension through a coating operation and coating the yarns with a high-strength strongly adherent liquid thermosetting organic resin composition that is maintained during the coating operation within the viscosity range of 200–12,000 centipoises;
   (3) bringing the resin composition to a track-free brittle state in which the resin
      (a) comprises between about 35 and 60 percent of the total volume of each resin-coated yarn, and
      (b) is highly viscous at a useful molding temperature whereby the resin remains with and lubricates the yarn on which it is coated during a molding operation; and
   (4) chopping the web of resin-coated yarns into individual resin-coated flat fiber segments that are each about ⅛ to 2 inches in length and consist of at least one and no more than a few parallel adjacent yarns.

2. The method of making a reinforced molding composition which flows at a useful molding temperature and molding pressure to occupy completely a complex cavity as a continuous resin binder matrix filled essentially uniformly throughout with randomly intermingled fibrous reinforcement, and that then hardens as a monolithic object having high strength properties in all directions, said method comprising the steps of
   (1) arranging continuous yarns of glass monofilaments into a flat compact single-layer web in which the yarns are in substantially parallel relation, each yarn having
      (a) a diameter of no more than about 0.01 inch,
      (b) a resin-receptive surface treatment, and
      (c) a twist of about one turn or more per inch;
   (2) drawing the web of yarns under even tension through a coating operation and coating and impregnating the yarns with a high-strength strongly adherent liquid thermosetting organic resin composition;
   (3) bringing the resin composition to a tack-free brittle state in which the resin
      (a) comprises between about 35 and 60 percent of the total volume of each resin-coated yarn, and
      (b) is highly viscous at a useful molding temperature whereby the resin remains with and lubricates the yarn on which it is coated during a molding operation; and
   (4) chopping the web of resin-coated yarns into individual resin-coated flat fiber segments that are each about ⅛ to 2 inches in length and consist of at least one and no more than a few parallel adjacent yarns.

3. A molding composition comprising a mass of mono-yarn and multi-yarn fiber segments prepared by the method of claim 2.

4. The molding composition of claim 3 in which the resin composition comprises a mixture of epoxy resin and epoxy-reactive curing agent.

References Cited

UNITED STATES PATENTS

| | | | |
|---|---|---|---|
| 2,730,455 | 1/1956 | Swann | 117—4 |
| 2,819,243 | 1/1958 | Baker | 260—40 |
| 2,745,491 | 5/1956 | Sonneborn et al. | 164—61 |
| 2,877,501 | 3/1959 | Bradt | 18—55 |
| 2,936,487 | 5/1960 | Paz | 18—48 |
| 2,989,498 | 6/1961 | Mackenzie et al. | 260—47 |

FOREIGN PATENTS 1,134,510  8/1962  Germany.

OTHER REFERENCES

R. H. Sonneborn: "Fiberglas Reinforced Plastics," Reinhold Pub. Co., New York (1954), pp. 175–80 relied upon, coll No. TA455P55S6, copy in Gp. 140.

Anon: "Chemical and Engineering News," Dec. 3, 1962, pp. 55 and 56 relied upon.

MORRIS LIEBMAN, *Primary Examiner.*

J. E. CALLAGHAN, *Assistant Examiner.*

U.S. DEPARTMENT OF COMMERCE
PATENT OFFICE
Washington, D.C. 20231

UNITED STATES PATENT OFFICE
CERTIFICATE OF CORRECTION

Patent No. 3,403,069                                                      September 24, 1968

Burton A. Benson

It is certified that error appears in the above identified patent and that said Letters Patent are hereby corrected as shown below:

Column 1, line 45, "exceeding" should read -- exceedingly --; line 52, "m should read -- may --. Column 2, line 11, "fo ruse" should read -- for use -- line 62, "widely-space" should read -- widely-spaced --. Column 7, line 30, "of" should read -- in --. Column 10, line 48, "0.03" should read -- .30 --. Column 13, line 36, "0.025" should read -- 0.05 --. Column 14, line 30, "track-free" should read -- tack-free --.

Signed and sealed this 14th day of April 1970.

(SEAL)
Attest:

Edward M. Fletcher, Jr.                                    WILLIAM E. SCHUYLER, JR.
Attesting Officer                                                  Commissioner of Patents